(12) United States Patent
Malinowski

(10) Patent No.: US 6,230,556 B1
(45) Date of Patent: May 15, 2001

(54) AXLE ASSEMBLY INTEGRATED WITH A TIRE INFLATION SYSTEM AND AN ELECTRONIC RECORDER

(75) Inventor: Mark E. Malinowski, Farmington Hills, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/185,793

(22) Filed: Nov. 4, 1998

(51) Int. Cl.$^7$ ..................................................... B60C 23/02
(52) U.S. Cl. .................................................. 73/146.2
(58) Field of Search .................................. 73/146, 146.2, 73/146.8, 146.5; 152/415, 416, 417, 427; 301/37.37, 37.1, 37.35, 37.36, 37.42, 108.1, 108.3, 108.4; 340/442, 443, 444, 445; 364/424, 561

(56) References Cited

U.S. PATENT DOCUMENTS

| | | |
|---|---|---|
| 3,700,164 | 10/1972 | Slagle . |
| 3,735,103 | 5/1973 | Finley . |
| 3,739,270 | 6/1973 | Miller et al. . |
| 3,780,272 | 12/1973 | Rohner . |
| 4,167,699 | 9/1979 | Baker . |
| 4,176,397 | 11/1979 | Crom et al. . |
| 4,491,007 | 1/1985 | Crowdes, Jr. . |
| 4,682,287 | 7/1987 | Mizuno et al. . |
| 4,697,278 | 9/1987 | Fleischer . |
| 4,782,878 | * 11/1988 | Mittal ................................. 73/146.5 |

OTHER PUBLICATIONS

U.S. patent application for Electronic Hub Odometer; filed Jan. 21, 1998; Ser. No. 09/010,016.

\* cited by examiner

*Primary Examiner*—William Oen
(74) *Attorney, Agent, or Firm*—Carlson, Gaskey & Olds

(57) ABSTRACT

An axle assembly includes an axle, a tire having a predetermined air inflation pressure rotatably supported on the axle, and a tire inflation system for detecting an actual tire inflation pressure less than the predetermined air inflation pressure, replenishing the tire with air, and producing an inflation signal. An inventive electronic recorder receives the inflation signal, increments a count register, and transmits count register data to an output device. In a first embodiment of this invention, the electronic recorder is mounted at an easily accessible location on a vehicle which includes the axle assembly. In a second embodiment of this invention, the tire is mounted to a wheel assembly and the axle assembly further includes an electronic hub odometer for detecting a revolution of the wheel assembly and producing an odometer signal. In this second embodiment, the electronic recorder includes a first count register for receiving the inflation signal, incrementing the first count register, and transmitting first count register data to an output device and a second count register for receiving the odometer signal, incrementing the second count register, determining the distance the wheel assembly has traveled from the second count register, and transmitting distance data to the output device. Preferably, the electronic recorder is mounted to a hub cap of the wheel assembly.

8 Claims, 2 Drawing Sheets

AXLE ASSEMBLY INTEGRATED WITH A TIRE INFLATION SYSTEM AND AN ELECTRONIC RECORDER

BACKGROUND OF THE INVENTION

This application relates to a unique system for electronically recording each inflation operation performed by an automatic tire inflation system. The electronic recorder receives, stores, and transmits inflation count data to an output device.

Tire inflation systems are designed primarily to detect an underinflated tire condition, typically the result of a slow air leak, and automatically replenish the tire with the proper air pressure. By maintaining proper tire pressure, tire inflation systems reduce accidents caused by improper tire inflation conditions. However, automatic tire inflation systems are relatively expensive and, therefore, installed primarily on tractor-trailers.

Most tire inflation systems include a warning light which is illuminated during engine key-on when a low tire air pressure is detected. Once the leaking tire is refilled with the proper air pressure, the warning light is switched off and the driver typically continues on route to the next scheduled destination. Often, the driver fails to report the tire leak to service repair personnel. Over time, failure to report the tire leak can lead to permanent tire damage resulting in lengthy service down-time and expensive tire replacement. Accordingly, it would be desirable to provide an electronic recorder for receiving, storing, and transmitting inflation count data to an output device to facilitate service repairs.

SUMMARY OF THE INVENTION

In a disclosed embodiment of this invention, an axle assembly is integrated with a tire inflation system. The axle assembly includes an axle, a tire having a predetermined air inflation pressure rotatably supported on the axle, and a tire inflation system for detecting an actual tire inflation pressure less than the predetermined air inflation pressure, replenishing the tire with air, and producing an inflation signal. An inventive electronic recorder receives the inflation signal, increments a count register, and transmits count register data to an output device. In a first embodiment of this invention, the electronic recorder is mounted at an easily accessible location on a vehicle which includes the integrated axle assembly.

In a second embodiment of this invention, the tire is mounted to a wheel assembly and the axle assembly further includes an electronic hub odometer for detecting a revolution of the wheel assembly and producing an odometer signal. In this second embodiment of the invention, the electronic recorder includes a first count register for receiving the inflation signal, incrementing the first count register, and transmitting first count register data to an output device and a second count register for receiving the odometer signal, incrementing the second count register, determining the distance the wheel assembly has traveled from the second count register, and transmitting distance data to the output device. Preferably, the electronic recorder is mounted to a hub cap of the wheel assembly. A system incorporating only the electronic hub odometer is disclosed in copending U.S. patent application Ser. No. 09/185,779, entitled "Axle Assembly Integrated with an Electronic Odometer."

These and other features of the present invention will be best understood from the following specification and drawings, the following of which is a brief description.

DETAILED DESCRIPTION OF THE PREFERRED EMBODIMENT

Figure 1:
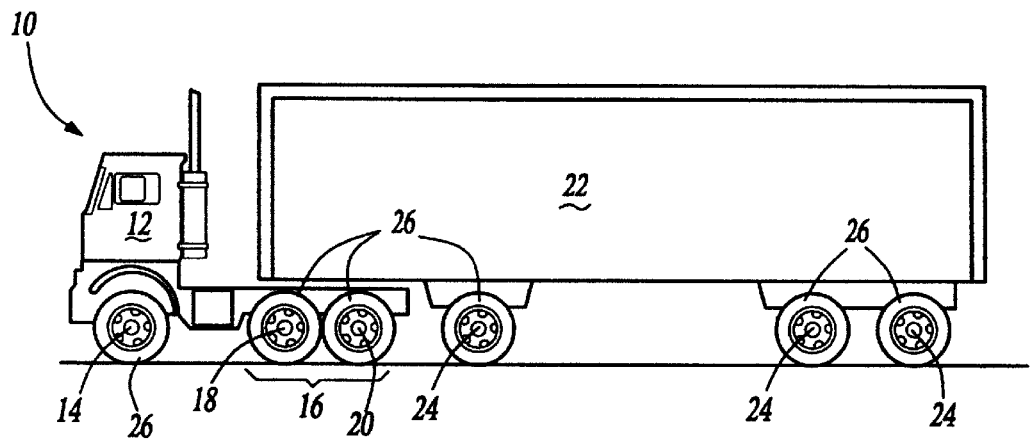
FIG. 1 is a side elevational view of a vehicle including an axle assembly integrated with a tire inflation system and an electronic recorder in accordance with the present invention.

FIG. 1 is a side elevational view of a heavy vehicle 10 including an axle assembly integrated with a tire inflation system and an electronic recorder in accordance with the present invention. The heavy vehicle 10 includes a tractor 12 with a front steering axle 14 and a rear drive axle 16. The front steering axle 14 can be either a driving or a non-driving axle. The tandem drive axle 16 is comprised of a front drive axle 18 and a rear drive axle 20. The tractor 12 pulls a trailer 22 which has trailer axles 24. The trailer axles 24 are typically non-drive axles. Each axle 14, 18, 20 and 24 includes a pair of wheel assemblies 26. The wheel assemblies 26 can be of various configurations known in the art. The invention can be used on any vehicle such as an automobile, pick-up truck, or tractor-trailer. The heavy vehicle 10 is used only for descriptive purposes and is not intended as a limitation of the invention.

Figure 2:
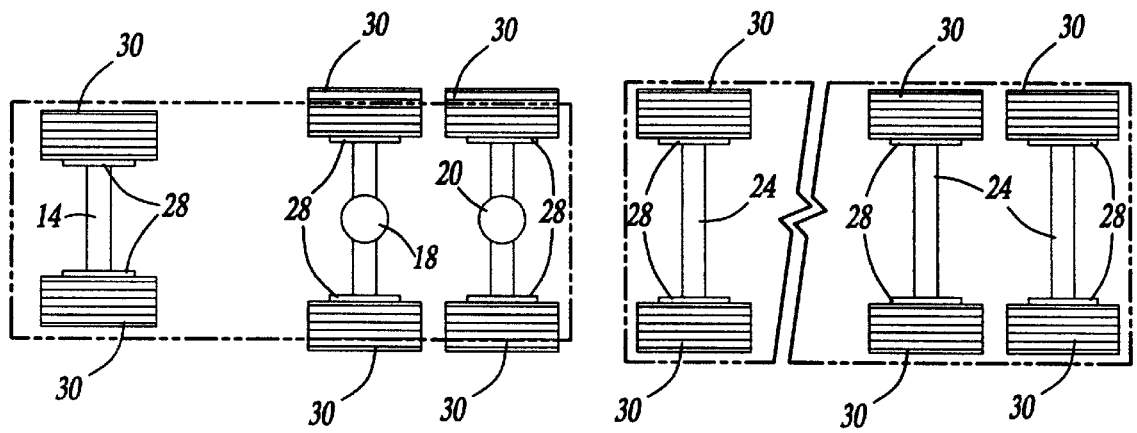
FIG. 2 is an enlarged, fragmentary bottom view of the vehicle shown in FIG. 1.

FIG. 2 is an enlarged, fragmentary bottom view of the heavy vehicle 10 shown in FIG. 1. A brake assembly 28 and a tire 30 are mounted to each wheel assembly 26. The brake assemblies 28 can be of various types known in the art, including drum brakes, disc brakes, air disc brakes, or wet disc brakes.

Figure 3:
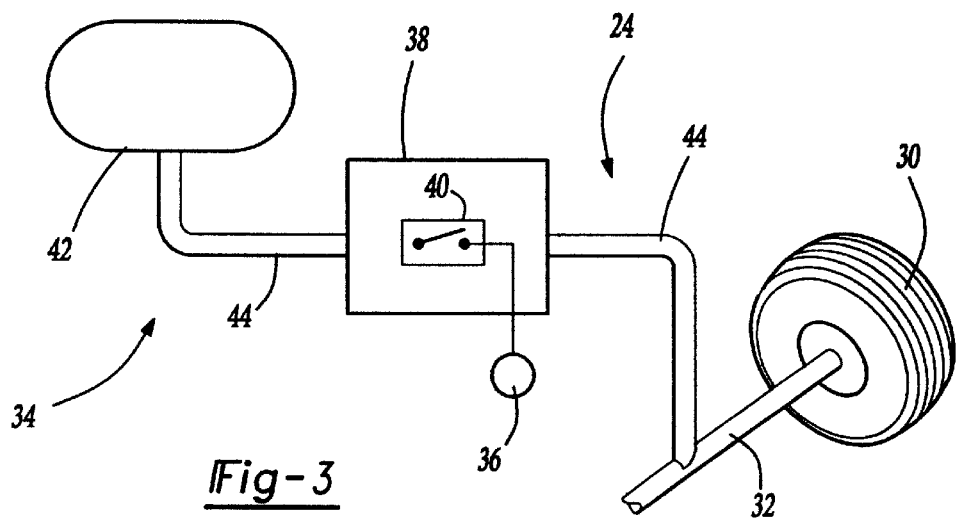
FIG. 3 is a schematic diagram of the axle assembly integrated with the tire inflation system and the electronic recorder in accordance with the present invention.

FIG. 3 is a schematic diagram of the axle assembly 24 in accordance with the present invention. The axle assembly 24 includes an axle 32 rotatably supporting the tire 30. In the present invention, a conventional tire inflation system 34 is integrated with the axle assembly 24. The tire inflation system 34 is designed to maintain a predetermined air inflation pressure the tire 30. Typically, the predetermined air inflation pressure is recommended by the tire manufacturer and is embossed on the sidewall of the tire 30. The tire inflation system 34 is designed to detect if the actual tire inflation pressure is less than the predetermined air inflation pressure or, in other words, if there is an air leak in the tire 30. If so, the tire inflation system 34 replenishes the tire 30 with air so that the actual tire inflation pressure is equal to the predetermined air inflation pressure. The tire inflation system 34 also produces an inflation signal which is transmitted to an inventive electronic recorder 36.

In a first embodiment of the present invention, the electronic recorder 36 is designed to receive the inflation signal, increment a count register, and transmit count register data to an output device. To make the extraction of count register data convenient, the electronic recorder 36 is mounted at an easily accessible location on the heavy vehicle 10.

The conventional tire inflation system 34 includes a controller 38 for maintaining the predetermined air inflation pressure in the tire 30. The controller 38 includes a sensor 40 which is responsive to an actual tire inflation pressure less than the predetermined air inflation pressure and produces the inflation signal. The sensor 40 may be a pressure switch or other similar device. The tire inflation system 34 further requires an air supply 42 for replenishing the tire 30 with air. Often, the air compressor installed in the tractor 12 is used as the air supply 42. Typically, the air supply 42, the controller 38, and the axle 32 are interconnected with flexible tubing 44. Such a conventional tire inflation system is commercially available, under the name "P.S.I. The Inflation System", through Pressure Systems International located in San Antonio, Tex.

A device which meets the functional and packaging requirements of the electronic recorder 36 is disclosed in copending U.S. patent application Ser. No. 09/185,779, entitled "Axle Assembly Integrated with an Electronic Odometer", filed on the same day as this application and incorporated by reference. As disclosed, the device is used to perform an electronic hub odometer function. However, the components of the device, including an internal power source, a microprocessor, and a reed switch sensor, are also capable of performing the functions of the electronic recorder 36. Particularly, the microprocessor for this application preferably includes two counter inputs or count register. Thus, in a second embodiment of the present invention, one count register may be used to receive the electronic odometer signal and the other count register may be used to receive the tire inflation system signal. Further, the power source, the microprocessor, and the reed switch sensor are mounted in a small button housing which is particularly adapted to meet the packaging requirements of the electronic recorder 36. Currently, various output devices for the extraction of data from the microprocessor in the button housing are commercially available.

Figure 4:
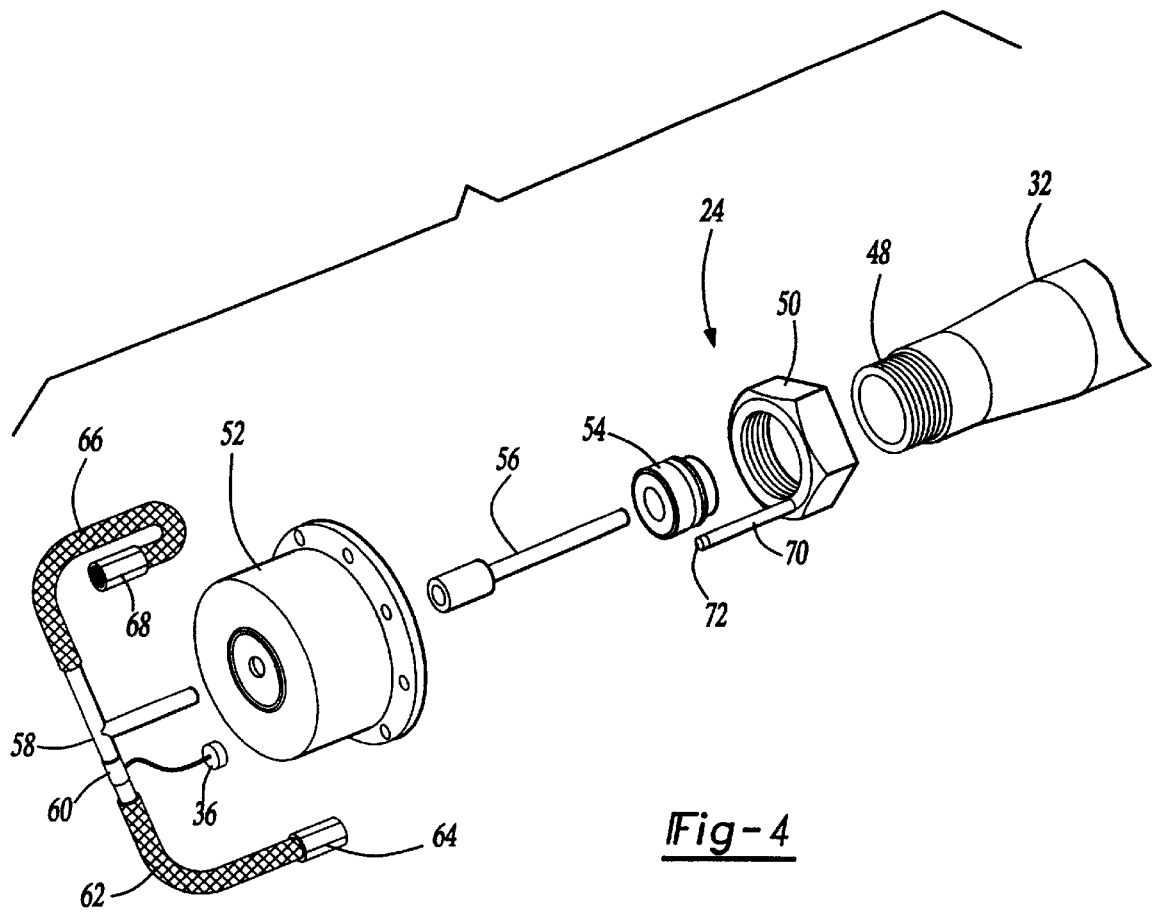
FIG. 4 is a fragmentary, exploded view, in perspective, of the axle assembly showing the electronic recorder mounted for use with the tire inflation system and an electronic hub odometer.

FIG. 4 is a fragmentary, exploded view, in perspective, of the axle assembly 24 showing the electronic recorder 36 mounted for use with the tire inflation system 34 and an electronic hub odometer system. In FIG. 4, the tire 30 and portions of the wheel assembly 26 have been removed to best show the mounting location of the electronic recorder 36 with respect to the unique packaging arrangement of the electronic hub odometer system.

The fixed or non-rotating axle 32 has a threaded spindle end 48. A jam nut 50 is threaded onto the spindle end 48 to rotatably support the wheel assembly (26, not shown) on the axle 30. A hub cap 52 is mounted to and rotates with the wheel assembly 26.

The tire inflation system 34 includes a pressure plug 54 designed to provide an air tight seal on the spindle end 48 of the axle 30, a tee assembly 58, and a stator 56 for sealed insertion between the pressure plug 54 and the tee assembly 58. The tee assembly 58 includes a second low air pressure sensor 60, a flexible braided hose 62 incorporating a one-way check valve (not shown) therein, and an end cap 64 for connecting the flexible braided hose 62 to a valve stem of the tire (30, not shown). The second low air pressure sensor 60 is wired to the electronic recorder 36. Similar to the sensor 40 described above, the second sensor 60 is designed to respond to an underinflation tire inflation pressure by producing and transmitting an inflation signal to the electronic recorder 36. The second sensor 60 may be a pressure switch or other similar device. For axles having a dual mounted tire arrangement, the tee assembly 58 further includes a second braided flexible hose 66 incorporating a second one-way check valve (not shown) therein, and a second end cap 68 for connecting the second hose 66 to a valve stem of a second tire. Accordingly, the tee assembly 58 including the second sensor 60, the electronic recorder 36, the hub cap 52, the wheel assembly (26, not shown), and the tire (30, not shown) rotate together in relation to the fixed or non-rotating axle 30.

The electronic odometer system 46 includes the electronic recorder 36, a bracket 70 mounted to the jam nut 50, and a magnet 72 attached to the end of the bracket 70 adjacent to the hub cap 52 and the electronic recorder 36. When fully assembled, the electronic recorder 36 is mounted on the hub cap 52. The bracket 70 and the magnet 72 are fixed to the non-rotating axle 30 while the hub cap 52 and the electronic recorder 36 rotate together in relation to the axle 30. In this unique packaging arrangement of the electronic odometer system 46, the magnet 72 is positioned eccentric to or radially offset from the axis of the axle 30. The electronic recorder 36 is mounted to the hub cap 52 in radial alignment with the magnet 72 such that rotation of the hub cap 52 aligns the sensor in the electronic recorder 36 for magnetic interaction with or responsiveness to the magnet 72 once per revolution of the hub cap 52. The sensor is designed to respond to the magnet 72 by producing an odometer signal.

In this second embodiment of the present invention, the electronic recorder 36 includes a first count register, as described above, for receiving the inflation signal, incrementing the first count register, and transmitting first count register data to an output device and a second count register for receiving the odometer signal, incrementing the second count register, determining the distance the wheel assembly 26 has traveled from the second count register, and transmitting distance data to the output device. Preferably, the magnet 72 produces a magnetic field and the sensor includes a micro-miniature reed switch for detecting the magnetic field of the magnet 72 and producing an odometer signal in response to each magnetic field detection. Specifically, the reed switch is configured so that the alignment of the magnet 72 and the reed switch produces a momentary discrete switch closure and hence a detectable count signal for each revolution of the wheel assembly 26. Each odometer signal is transmitted from the sensor to the microprocessor located in the electronic recorder 36. Calibrated with the diameter of the wheel assembly 26, the microprocessor uses the odometer signal data (or, in other words, the number of wheel assembly revolutions) to calculate the distance that the wheel assembly 26 has traveled.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An axle assembly including a tire inflation system, the assembly comprising:

an axle;

a tire having a predetermined air inflation pressure rotatably supported on said axle;

a tire inflation system for detecting an actual tire inflation pressure less than said predetermined air inflation pressure, replenishing said tire with air, and producing an inflation signal; and an electronic recorder for receiving said inflation signal, incrementing a count register, and transmitting count register data to an output device.

2. An axle assembly as set forth in claim 1 wherein said tire inflation system includes a controller for maintaining said predetermined air inflation pressure in said tire.

3. An axle assembly as set forth in claim 2 wherein said controller includes a sensor responsive to an actual tire inflation pressure less than said predetermined air inflation pressure for producing said inflation signal.

4. An axle assembly as set forth in claim 3 wherein said tire inflation system includes an air supply for replenishing said tire with air.

5. An axle assembly including an electronic hub odometer and a tire inflation system, the assembly comprising:

an axle defining an axis;

a wheel assembly rotatably supported on said axle for rotating relative to the axle axis;

an electronic hub odometer for detecting a revolution of said wheel assembly and producing an odometer signal;

a tire having a predetermined air inflation pressure mounted on said wheel assembly;

a tire inflation system for detecting an actual tire inflation pressure less than said predetermined air inflation pressure, replenishing said tire with air, and producing an inflation signal; and an electronic recorder including a first count register for receiving said inflation signal, incrementing said first count register, and transmitting first count register data to an output device and a second count register for receiving said odometer signal, incrementing said second count register, determining the distance said wheel assembly has traveled from said second count register, and transmitting distance data to the output device.

6. An axle assembly as set forth in claim 5 wherein said tire inflation system includes a controller for maintaining said predetermined air inflation pressure in said tire.

7. An axle assembly as set forth in claim 6 wherein said tire inflation system includes a sensor responsive to an actual tire inflation pressure less than said predetermined air inflation pressure for producing said inflation signal.

8. An axle assembly as set forth in claim 7 wherein said tire inflation system includes an air supply for replenishing said tire with air.

* * * * *